J. BURT & L. F. DUNN,
Assignors to C. A. SHAW.
Device for Cutting Green Corn from the Cob.
No. 8,854. Reissued Aug. 19, 1879.
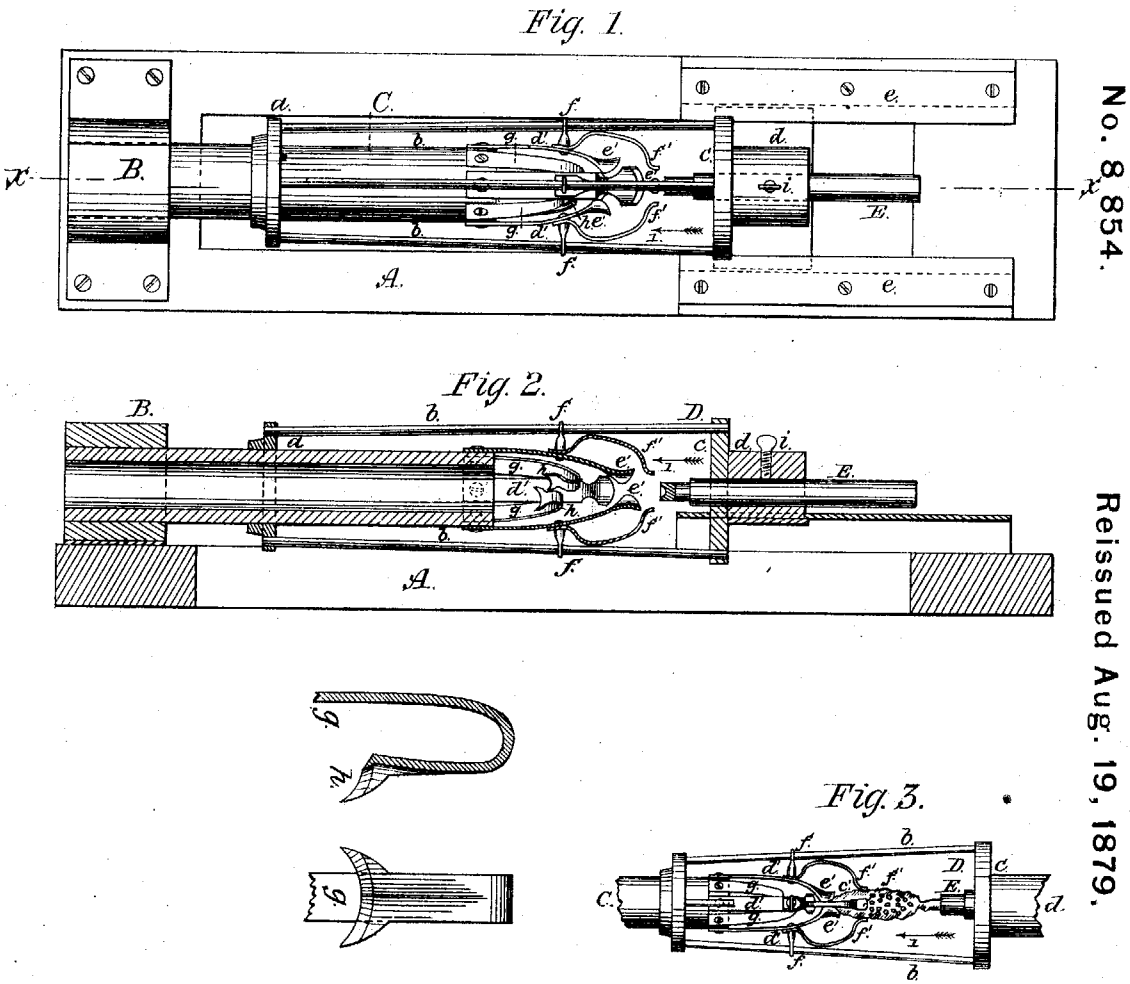
*Witnesses,*
Frank Foster.
J. D. Thorndike.
*Inventors,*
Jonathan Burt.
Lionard F. Dunn.
*Per* C. A. Shaw.
*Attorney.*
N. PETERS, PHOTO-LITHOGRAPHER, WASHINGTON, D. C.

UNITED STATES PATENT OFFICE.

JONATHAN BURT AND LEONARD F. DUNN, OF LENOX, NEW YORK, ASSIGNORS TO CHARLES A. SHAW, OF SALEM, MASSACHUSETTS.

IMPROVEMENT IN DEVICES FOR CUTTING GREEN CORN FROM THE COB.

Specification forming part of Letters Patent No. 55,614, dated June 19, 1866; Reissue No. 8,854, dated August 19, 1879; application filed June 16, 1879.

*To all whom it may concern:*

Be it known that we, JONATHAN BURT and LEONARD F. DUNN, of Lenox, in the county of Madison, State of New York, have invented certain new and useful Improvements in Machines for Cutting Green Corn from the Cob, of which the following is a description sufficiently full, clear, and exact to enable any person skilled in the art or science to which our invention appertains to make and use the same, reference being had to the accompanying drawings, forming a part of this specification, in which—

Figure 1 is a plan or top view of our improved machine. Fig. 2 is a longitudinal sectional view of the same, taken on the line *x x;* and Fig. 3, a side view of a portion of the machine, showing it in use, or its operation on an ear of corn.

Like letters of reference indicate corresponding parts in the different figures of the drawings.

Our invention relates to means for cutting or removing green corn from the cob; and consists in a mechanism having a novel construction and arrangement of parts, as hereinafter fully described and claimed, by which a more effective device of this character is produced than was in ordinary use prior thereto.

In the drawings, A represents a bed-piece, which may be of rectangular form, and is provided with a fixed head or stock, B, in which one end of a horizontal tube, C, is permanently secured. D is a sliding frame, composed of the collar *a*, four rods, *b*, plate or flange *c*, and the head or stock *d*.

The collar *a* is fitted to slide freely on the tube C, and has one end of the rods *b* attached thereto, the opposite ends being secured in the plate *c*.

The head or stock *d* is attached to the plate *c*, and fitted to work longitudinally between the guides or ways *c e* on the bed-piece A.

The rods *b* are not parallel with each other, but are arranged in an oblique or inclined position, being nearer together at their junction with the collar *a* than at the plate *c*.

The frame D is designed to slide freely back and forth, and may be operated through the medium of a treadle or by any other suitable means.

To the inner end of the tube C there are secured at equal distances apart four springs or elastic plates, *d'*, on the outer or free ends of which there are formed knives or cutters *e'*, which are curved in a direction partially transverse with the tube C, and to correspond with the curvature of an ear of corn. These springs or plates *d'* are not of equal length, two of them being considerably longer than the other two—that is to say, there is one pair of long springs, the members of which are arranged on opposite sides of the path, followed by the ear of corn on its way through the machine, and one pair of short springs arranged in like manner, as shown, so that the two cutters *e'*, which are on the long springs, will consequently be in advance of or nearer the plate *c* than those on the short springs. One of the long springs *d'* is also slightly shorter than the other, and one of the short springs *d'* is slightly longer than the other, so that no two of the cutters *e'* are precisely opposite each other when in use. The two pairs of springs are also so arranged that the cutters on the long springs will be as nearly as possible, at right angles with those on the short springs, the long springs *d'* being preferably secured to the tube C in such a manner as to bring their respective cutters *e'* against the top and bottom of the ear of corn when the machine is in use, as best seen in Fig. 2, the short springs being so secured to said tube as to bring their respective cutters against the sides of the ear at the same time, as seen in Fig. 1.

The object of this peculiar construction and arrangement of the springs and cutters, as described, is to enable the cutters to work without interfering with each other, and to encircle or grasp the ear of corn on its passage between them in such a manner as to perform their work more perfectly.

Attached to each of the springs *d'*, at some distance from the cutters *e'*, there is an eye, *f*, through which the rods *b* of the frame D pass, so that when the frame is moved in the direction indicated by the arrow 1 the oblique rods *b* will expand or separate the cutters in a manner which will be readily understood.

Each of the plates or springs $d'$ has also a curved spring or elastic plate, $f'$, attached to it, as shown. These last-named plates project in front of the cutters or knives $e'$, as seen in Figs. 1 and 2, and serve as guides to direct the ear of corn properly to the cutters. Being attached directly to the springs on which the cutters are disposed, these guides yield in unison with the cutters, and thus prevent any undue pressure on the ear of corn on its passage through them.

To the inner end of the tube C there are also attached four springs or elastic plates, $g$, which are arranged equidistant between the plates or springs $d'$. The outer or free ends of the plates $g$ are curved or bent inward and toward said tube, and have each a lip or scraper, $h$, formed on them, as best seen in Fig. 2.

The scrapers $h$, like the cutters $e'$, are curved in a direction partially transverse with the tube C, the outer ends of the plates $g$ being bent inward and backward to give the scrapers $h$ a strictly scraping or dragging instead of a pushing or cutting action on the cob or ear.

An adjustable rod or plunger, E, is fitted centrally and loosely in the head or stock $d$, being secured in a horizontal position at any desired point by the set-screw $i$. This rod is so arranged that its longitudinal axial line, if extended, will become coincident with that of the tube C and pass centrally between the cutters $e'$, scrapers $h$, and guides $f'$.

In the use of our improved machine the ear of corn to be operated upon is inserted in the frame D, the butt of the ear being placed against the inner end of the rod or plunger E, and its point directed between the outer ends of the guides $f'$, the rod E being first adjusted in the head $d$ to correspond with the size of the ear. The frame D is then moved in the direction indicated by the arrow 1, and the ear of corn forced between or through the guides $f'$, cutters $e'$, and scrapers $h$, the springs of these respective parts yielding to admit of its passage.

It will be understood that the guides $f'$ "center" the ear, and direct it properly to the cutters $e'$, which cut off or remove the body of the kernels of corn, after which the ear passes to the scrapers, which scrape or squeeze out the "chit" or sweetest portion of the kernel. The cob then passes into the tube C, from which it is expelled by the cob of the succeeding ear, said tube not only serving as a duct to convey the cobs from the machine, but also acting as a stock or holder for the cutters and scrapers.

The eyes $f$, working in conjunction with the inclined rods $b$ and springs $d$, are auxiliary in their functions, being designed to assist in opening or expanding the guides $f'$ and cutters $e'$ to such an extent as to prevent any undue pressure which may be exerted on the larger ears of corn, and also avoid injurious contact of those parts with the plunger E as it advances.

The scrapers $h$ are disposed in pairs substantially the same as the cutters $e'$, and so that no two scrapers are opposite each other when the machine is in operation, one pair being placed in advance of or somewhat nearer the cutters than the other, and the two pairs so arranged as to occupy opposite sides of the path or course followed by the ear or cob, this disposition of the scrapers being adopted for substantially the same reasons as apply to a like arrangement of the cutters.

It will be observed that our improvement, taken as a whole, consists in an organized mechanism for cutting the corn from the cob and scraping out or removing the chit of the kernel in a very rapid and effective manner.

Having thus described our invention, what we claim is—

1. In a machine for cutting green corn from the cob, the cutters $e'$ and scrapers $h$, combined and operating substantially as specified.

2. In a machine for cutting green corn from the cob, the cutters $e'$, scrapers $h$, and rod or plunger E, combined and operating substantially as set forth.

3. In a machine for cutting green corn from the cob, the cutters $e'$, scrapers $h$, plunger or rod E, and guides $f'$, combined and operating substantially in the manner described.

4. In a machine for cutting green corn from the cob, the oblique rods $b$, eyes $f$, and cutters $e'$, combined and operating substantially as specified.

5. In a machine for cutting green corn from the cob, the oblique rods $b$, eyes $f$, cutters $e'$, and guides $f'$, combined and operating substantially as set forth.

6. In a machine for cutting green corn from the cob, the cutters $e'$, scrapers $h$, tube C, and plunger or rod E, combined and operating substantially as set forth.

7. In a machine for cutting green corn from the cob, the cutters $e'$, scrapers $h$, guides $f'$, tube C, and plunger or rod E, combined and operating substantially as specified.

8. In a machine for cutting green corn from the cob, the sliding carriage D, carrying the plunger E, in combination with the cutters, scrapers, guides, and tube, substantially as and for the purpose specified.

JONATHAN BURT.
LEONARD F. DUNN.

Witnesses:
T. E. BARNES,
LUTHER J. ALLEN.